UNITED STATES PATENT OFFICE.

WILLIAM HAMILTON BROWNLOW, OF BROCKVILLE, ONTARIO, CANADA.

ARTIFICIAL RUBBER.

No. 869,618.      Specification of Letters Patent.      Patented Oct. 29, 1907.

Application filed January 15, 1907. Serial No. 352,399.

*To all whom it may concern:*

Be it known that I, WILLIAM HAMILTON BROWNLOW, of the town of Brockville, in the county of Leeds, Province of Ontario, Dominion of Canada, locomotive-engineer, have invented certain new and useful Improvements in Artificial Rubber, of which the following is a specification.

This invention relates to an improved artificial rubber which may be very cheaply manufactured and which may, in a great many instances replace natural rubber. In particular, the compound is useful for filling pneumatic tires, to render the same puncture-proof, and for the manufacturing of small molded rubber toys.

The composition consists of the following ingredients combined in the proportions stated, viz:—

| | |
|---|---|
| Glue | 7,000 grains. |
| Molasses | 7,000 " |
| Glycerin | 1,750 " |
| Wood tar | 15 " |

The mixture is heated by steam or hot water in any form of ordinary glue pot. The tar is an important element in the combination and serves to toughen the composition and give the same, practically the appearance of rubber.

For use in pneumatic tires the mixture is inserted in the tires in its liquid condition and when it cools it becomes a dense but elastic substance greatly resembling rubber in its appearance and properties. By filling the tires with this under pressure all the cushioning effects of an ordinary pneumatic tire are obtained without the disadvantage of the liability to puncture.

It will be understood that in carrying out my invention certain changes may be made in the proportions of the compound without materially departing from the spirit of my invention.

What I claim as my invention is:—

The herein described composition of matter, for the purpose specified, consisting of glue, seven thousand grains, or thereabouts, molasses, seven thousand grains or thereabouts, glycerin, one thousand, seven hundred and fifty grains or thereabouts, wood tar, fifteen grains or thereabouts, substantially as described and as and for the purpose specified.

Signed at Brockville, in the Province of Ontario, Canada, this 11th day of January, 1907.

WILLIAM HAMILTON BROWNLOW.

Witnesses:
ALLEN TURNER,
JAMES ALEXANDER WOOD.